United States Patent
Manolakos et al.

(10) Patent No.: US 12,267,854 B2
(45) Date of Patent: Apr. 1, 2025

(54) TECHNIQUES FOR DOWNLINK AND UPLINK DATA DCI TRIGGERING FOR FULL DUPLEX UES IN A WIRELESS COMMUNICATION SYSTEM

(71) Applicant: QUALCOMM Incorporated, San Diego, CA (US)

(72) Inventors: Alexandros Manolakos, Escondido, CA (US); Muhammad Sayed Khairy Abdelghaffar, San Jose, CA (US); Ahmed Attia Abotabl, San Diego, CA (US); Krishna Kiran Mukkavilli, San Diego, CA (US); Wanshi Chen, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 17/778,360

(22) PCT Filed: Dec. 23, 2020

(86) PCT No.: PCT/US2020/066909
§ 371 (c)(1),
(2) Date: May 19, 2022

(87) PCT Pub. No.: WO2021/133953
PCT Pub. Date: Jul. 1, 2021

(65) Prior Publication Data
US 2023/0026410 A1  Jan. 26, 2023

(30) Foreign Application Priority Data
Dec. 27, 2019 (GR) .............................. 20190100591

(51) Int. Cl.
*H04L 5/00* (2006.01)
*H04L 5/14* (2006.01)
(Continued)

(52) U.S. Cl.
CPC ......... *H04W 72/232* (2023.01); *H04L 5/0051* (2013.01); *H04L 5/0053* (2013.01);
(Continued)

(58) Field of Classification Search
CPC .......... H04L 5/0001–26; H04J 11/0023–0093; H04J 2011/0003–0096;
(Continued)

(56) References Cited

U.S. PATENT DOCUMENTS 10,674,499 B2   6/2020 Lyu et al.
10,708,764 B2   7/2020 Hayashi et al.
(Continued)

FOREIGN PATENT DOCUMENTS

EP          3319388 A1 *  5/2018  ............... H04L 5/14
WO     2015060620 A1     4/2015

OTHER PUBLICATIONS

Anonymous: "RRC IE—UE Capability Info," Nov. 25, 2019 (Nov. 25, 2019), pp. 1-10, XP055792288, Retrieved from the Internet: URL: https://web.archive.org/web/20191125091151/https://www.sharetechnote.com/html/Handbook_LTE_RRC_IE_UE_Capability.html [retrieved-on Apr. 1, 2021] p. 1. (Year: 2019).*
(Continued)

*Primary Examiner* — Timothy J Weidner
(74) *Attorney, Agent, or Firm* — Arent Fox LLP /Qualcomm Incorporated

(57) ABSTRACT

In an aspect, the present disclosure includes a method, apparatus, and computer readable medium for wireless communications for transmitting, by a UE to a network entity, a radio resource control (RRC) configuration message indi-
(Continued)

cating a full-duplex capability of the UE; receiving, by the UE from the network entity, a downlink control information (DCI) message, wherein the DCI message enables concurrent transmission on an uplink channel and reception on a downlink channel by the UE; and communicating, between the UE and the network entity, based on the DCI message.

27 Claims, 11 Drawing Sheets

(51) Int. Cl.
*H04W 8/22* (2009.01)
*H04W 72/0446* (2023.01)
*H04W 72/0453* (2023.01)
*H04W 72/23* (2023.01)
*H04W 72/232* (2023.01)
*H04W 84/02* (2009.01)
*H04W 88/02* (2009.01)
*H04W 88/08* (2009.01)
*H04W 92/02* (2009.01)
*H04W 92/10* (2009.01)

(52) U.S. Cl.
CPC .......... *H04L 5/0092* (2013.01); *H04L 5/1423* (2013.01); *H04W 8/22* (2013.01); *H04W 72/0446* (2013.01); *H04W 72/0453* (2013.01); *H04W 72/23* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ... H04W 8/22–245; H04W 72/02–569; H04W 84/02–16; H04W 88/02–12; H04W 92/02–04; H04W 92/10
See application file for complete search history.

(56) References Cited

U.S. PATENT DOCUMENTS

2016/0330011 A1* 11/2016 Lee ........................... H04L 5/14
2019/0059099 A1    2/2019 Davydov et al.
2019/0230499 A1    7/2019 Sun et al.
2019/0261409 A1    8/2019 Chen et al.
2019/0363843 A1   11/2019 Gordaychik
2019/0387481 A1   12/2019 Yang et al.
2021/0329660 A1* 10/2021 Zhang ................... H04W 72/23
2021/0392625 A1* 12/2021 Lin ........................ H04W 72/23

OTHER PUBLICATIONS

Anonymous: "RRC IE—UE Capability Info," Nov. 25, 2019 (Nov. 25, 2019), pp. 1-10, XP055792288, Retrieved from the Internet: URL: https://web.archive.org/web/20191125091151/https://www.sharetechnote.com/html/Handbook_LTE_RRC_IE_UE_Capability.html [retrieved-on Apr. 1, 2021] p. 1.
International Search Report and Written Opinion—PCT/US2020/066909—ISA/EPO—Apr. 15, 2021.
Smee J., "5 Technologies Making 5G NR a Reality," Light Reading, Feb. 22, 2017 (Feb. 22, 2017), pp. 1-11, XP055792282, Retrieved from the Internet: URL: https://www.lightreading.com/mobile/5g/5-technologies-making-5g-nr-a-reality/a/d-id/730056 [retrieved on Apr. 1, 2021] p. 2.

* cited by examiner

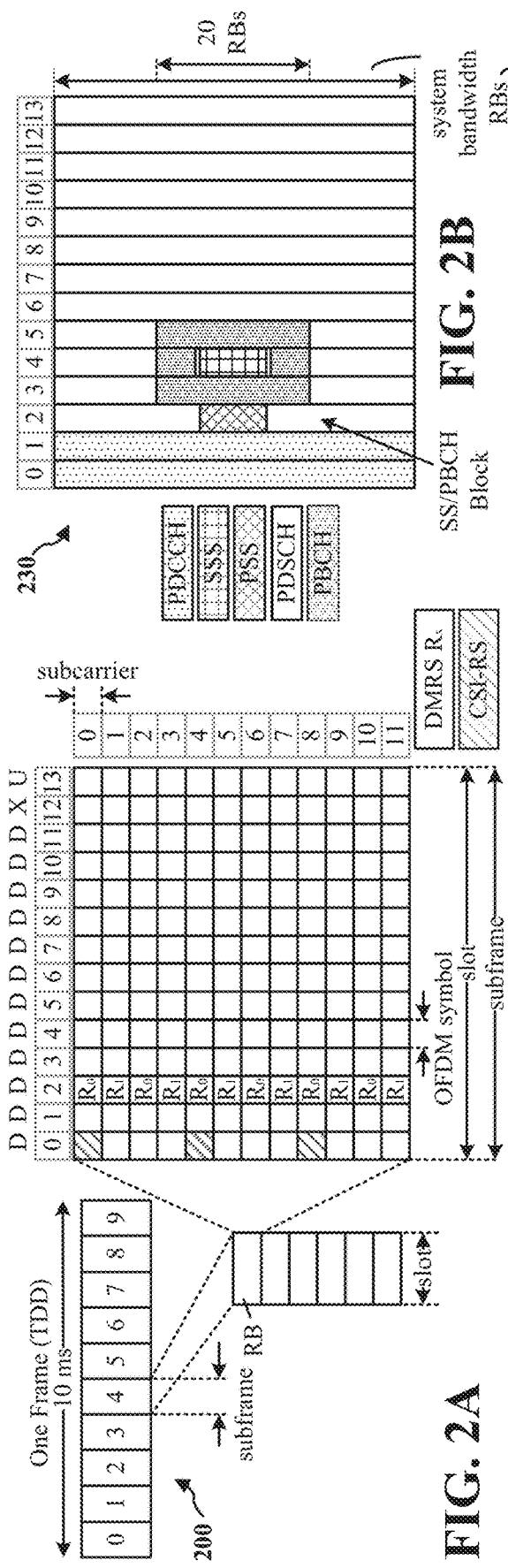
FIG. 2A
FIG. 2B
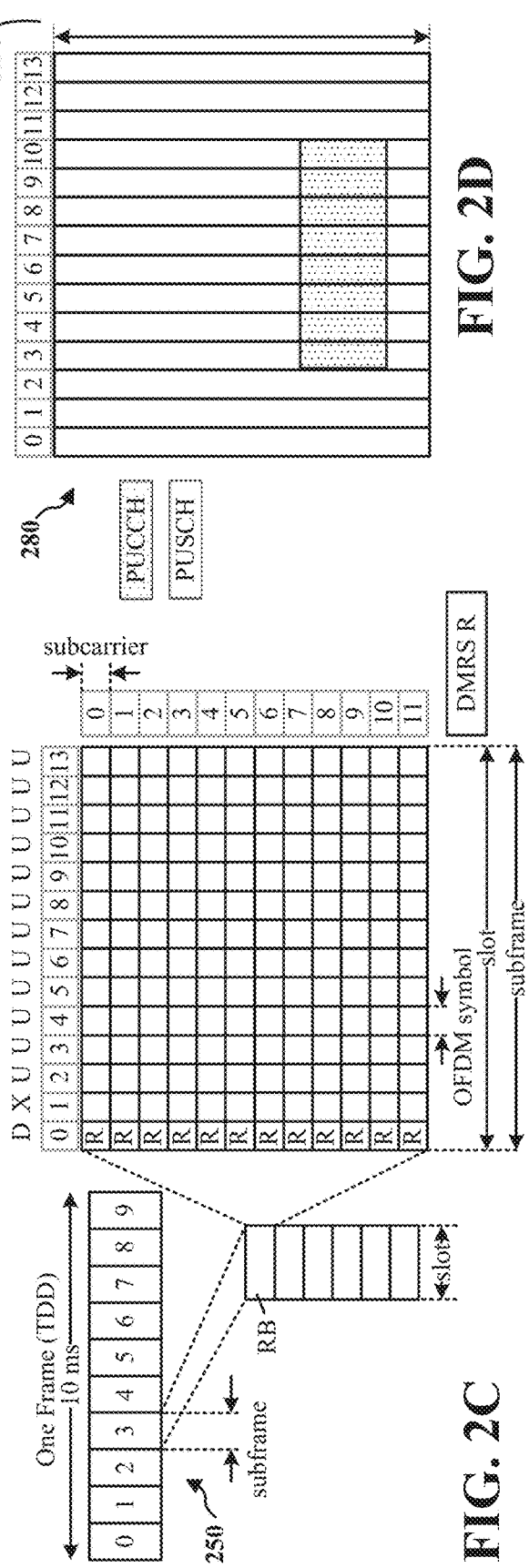
FIG. 2C
FIG. 2D

TECHNIQUES FOR DOWNLINK AND UPLINK DATA DCI TRIGGERING FOR FULL DUPLEX UES IN A WIRELESS COMMUNICATION SYSTEM

CROSS-REFERENCE TO RELATED APPLICATION(S)

This application is a 35 U.S.C. § 371 National Phase of PCT Application No. PCT/US2020/066909, filed Dec. 23, 2020, which claims priority to Greek Application No. 20190100591 filed Dec. 27, 2019, each assigned to the assignee hereof and hereby expressly incorporated by reference herein.

BACKGROUND

The present disclosure relates generally to communication systems, and more particularly, to downlink and uplink data downlink control information (DCI) triggering for full-duplex user equipments (UEs) in fifth generation new radio (5G NR).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Due to the increasing demand for wireless communications, there is a desire to improve the efficiency of wireless communication network techniques.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication, including transmitting, by a user equipment (UE) to a network entity, a radio resource control (RRC) configuration message indicating a full-duplex capability of the UE; receiving, by the UE from the network entity, a downlink control information (DCI) format message, wherein the DCI format message enables concurrent transmission of an uplink channel and reception of a downlink channel by the UE on a same component carrier, wherein the concurrent transmission and reception comprises a transmission and reception in at least one overlapping orthogonal frequency division multiplexing (OFDM) symbol; and communicating, between the UE and the network entity, based on the DCI format message.

An example implementation includes a method of wireless communication, including transmitting, by a UE to a network entity, a RRC configuration message indicating at least one of a half-duplex capability or a full-duplex capability of the UE; receiving, by the UE from the network entity, a first DCI format message for scheduling receptions on a downlink channel; receiving, by the UE from the network entity, a second DCI format message for scheduling transmission on an uplink channel; and communicating, between the UE and the network entity, based on the first DCI format message and the second DCI format message. In an example, the first DCI format message is received separately from the second DCI format message In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a non-transitory computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
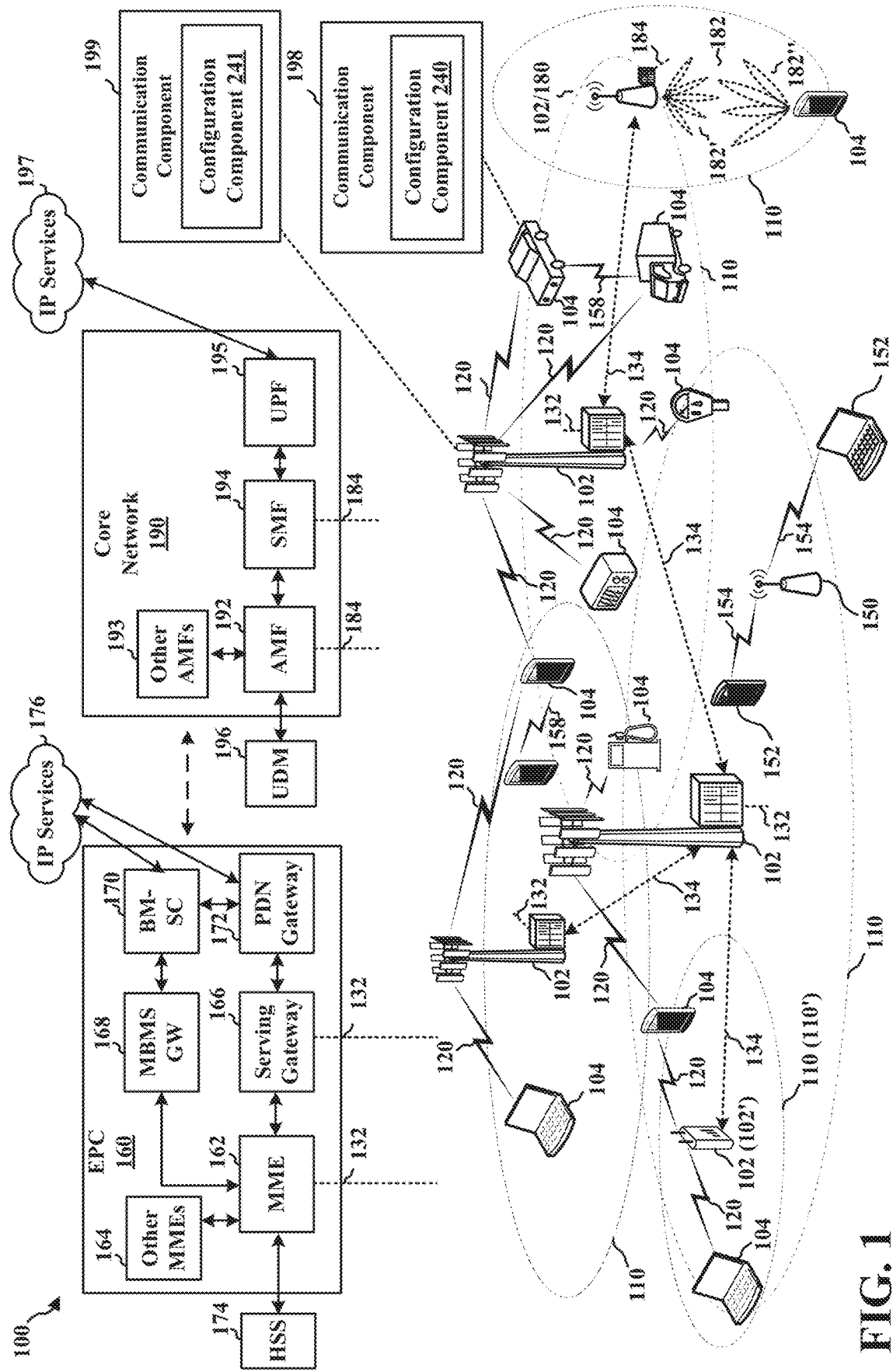
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 configured for downlink and uplink data downlink control information (DCI) triggering for full-duplex user equipments (UEs) in fifth generation new radio (5G NR). The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, the UE 104 may be configured to operate a communication component 198 and/or a configuration component 240 to transmit to a network entity, a radio resource control (RRC) configuration message indicating a full-duplex capability of the UE; receive, from the network entity, a DCI format message, wherein the DCI format message enables concurrent transmission of an uplink channel and reception of a downlink channel by the UE on a same component carrier, wherein the concurrent transmission and reception comprises a transmission and reception in at least one overlapping orthogonal frequency division multiplexing (OFDM) symbol; and communicate, with the network entity, based on the DCI format message.

In another aspect, the UE 104 may be configured to operate the communication component 198 and/or a configuration component 240 to transmit to a network entity, a RRC configuration message indicating at least one of a half-duplex capability or a full-duplex capability of the UE; receive, from the network entity, a first DCI format message for scheduling receptions on a downlink channel; receive, from the network entity, a second DCI format message for scheduling transmission on an uplink channel; and communicate, with the network entity, based on the first DCI format message and the second DCI format message. In one example, the first DCI format message is received separately from the second DCI format message.

Correspondingly, in certain aspects, the network entity (e.g., base station 102) and/or another UE, such as UE 104, may be configured to operate a communication component 199 and/or a configuration component 241 to transmit DCI format messages to UE 104. For example, communication component 199 and/or a configuration component 241 may transmit one or more DCI format messages to the UE 104 and communicate with the UE 104 based on the DCI format messages.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE internet protocol (IP) address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, the UEs 104, and/or the secondary UEs (or sidelink UEs) 110 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A and 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 2A-2D provide an example of slot configuration 0 with 14 symbols per slot and numerology $\mu$=0 with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/ symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
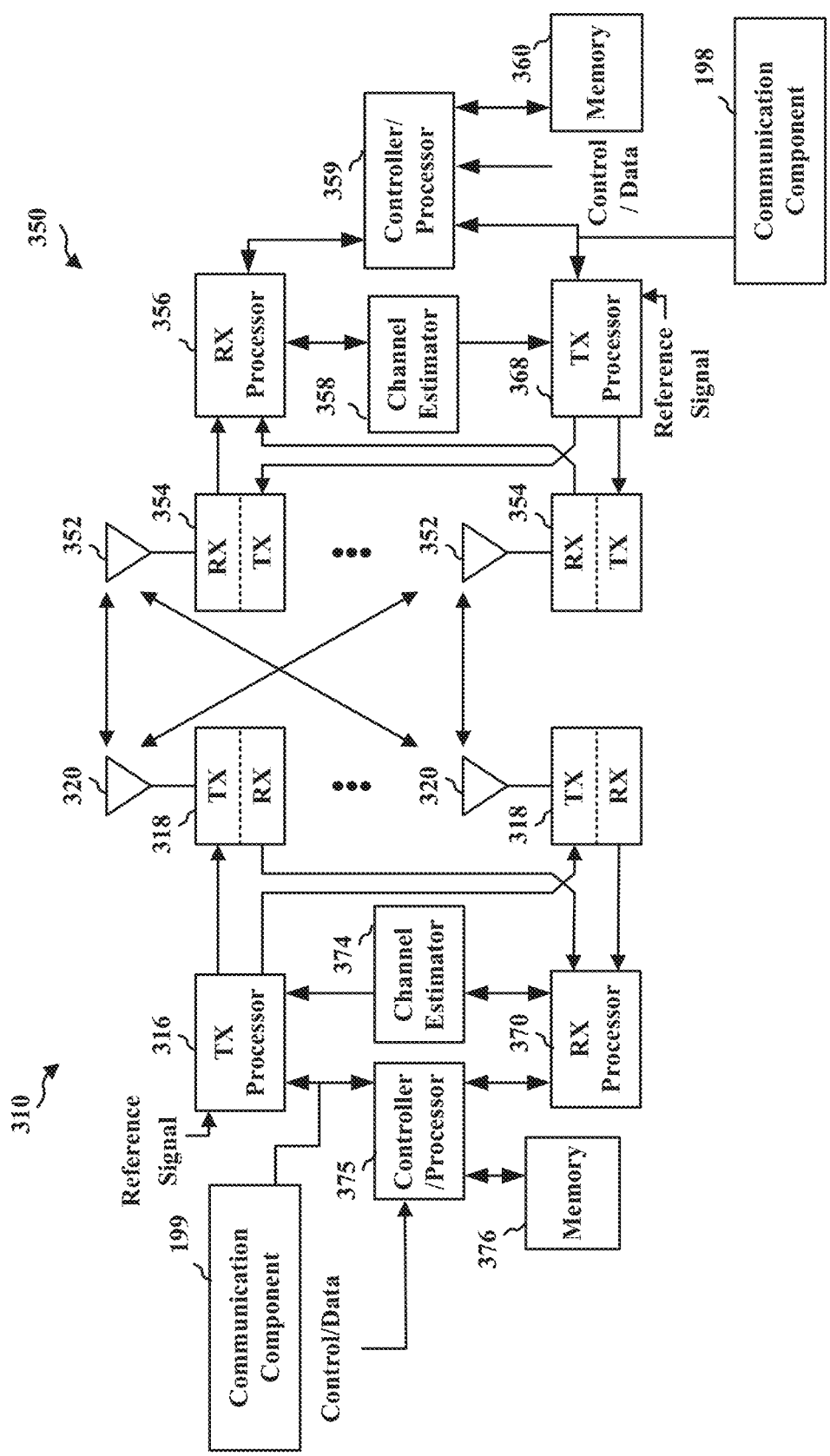
FIG. 3 is a diagram illustrating an example of a base station and user equipment (UE) in an access network.

FIG. 3 is a block diagram of a base station 310 in communication with a UE 350 in an access network, where the base station 310 may be an example implementation of base station 102 and where UE 350 may be an example implementation of UE 104. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with communication component 198 of FIG. 1.

At least one of the TX processor 316, the RX processor 370, and the controller/processor 375 may be configured to perform aspects in connection with communication component 199 of FIG. 1.

Referring to FIGS. 4-10, the described features generally relate to downlink and uplink data downlink control information (DCI) triggering for full-duplex UEs in fifth generation new radio (5G NR). For example, currently two separate DCI format messages are utilized when scheduling information for the uplink channel and the downlink channel.

Currently, DCI format 1_1 schedules information for the downlink channel. In an example, DCI format 1_1 includes fields for Frequency domain Resource assignment (FDRA), Frequency domain assignment Type (Type 0/1), Time domain Resource Allocation (TDRA), precoding resource block group (PRG) bundling Indicator, VRB-2-PRB mapping Indicator, Carrier Indicator, Rate matching indicator, ZP CSI-RS trigger, TCI-state Indication, bandwidth part (BWP) Indicator, MCS, NDI, redundancy version (RV) per TB, HARQ Process Number, Antenna port, PUCCH resource indicator, transmit power control (TPC) command for scheduled PUCCH, SRS request, code block group (CBG) transmission information, DMRS sequence initialization.

Currently, DCI format 0_1 schedules information for the uplink channel. In an example, DCI format 0_1 includes fields for Carrier indicator, Bandwidth part indicator, Frequency domain resource assignment, Time domain resource assignment, Frequency hopping flag, Modulation and coding scheme, New data indicator, Redundancy version, HARQ process number, TPC command for scheduled PUSCH, UL/SUL indicator, SRS resource indicator, Precoding information and number of layers, Antenna ports, SRS request, CSI request, CBG transmission information (CBGTI), PTRS-DMRS association, beta offset indicator, DMRS sequence initialization, and UL-SCH indicator.

Accordingly, DCI format 1_1 and DCI format 0_1 share a number of fields, such as but not limited to, antenna port and SRS request fields.

The present disclosure relates generally to current issues of downlink and uplink data DCI triggering for full-duplex UEs. For example, in an aspect, the present disclosure includes a method, apparatus, and non-statutory computer readable medium for wireless communications for transmitting, by a UE to a network entity, a radio resource control (RRC) configuration message indicating a full-duplex capability of the UE; receiving, by the UE from the network entity, a DCI format message, wherein the DCI format message enables concurrent transmission of an uplink channel and reception of a downlink channel by the UE on a same component carrier, wherein the concurrent transmission and reception comprises a transmission and reception in at least one overlapping orthogonal frequency division multiplexing (OFDM) symbol; and communicating, between the UE and the network entity, based on the DCI format message. In another aspect, for example, the present disclosure includes a method, apparatus, and non-statutory computer readable medium for wireless communications for transmitting, by a UE to a network entity, a RRC configuration message indicating at least one of a half-duplex capability or a full-duplex capability of the UE; receiving, by the UE from the network entity, a first DCI format message for scheduling receptions on a downlink channel; receiving, by the UE from the network entity, a second DCI format message for scheduling transmission on an uplink channel; and communicating, between the UE and the network entity, based on the first DCI format message and the second DCI format message. In one example, the first DCI format message is received separately from the second DCI format message.

Figure 4:
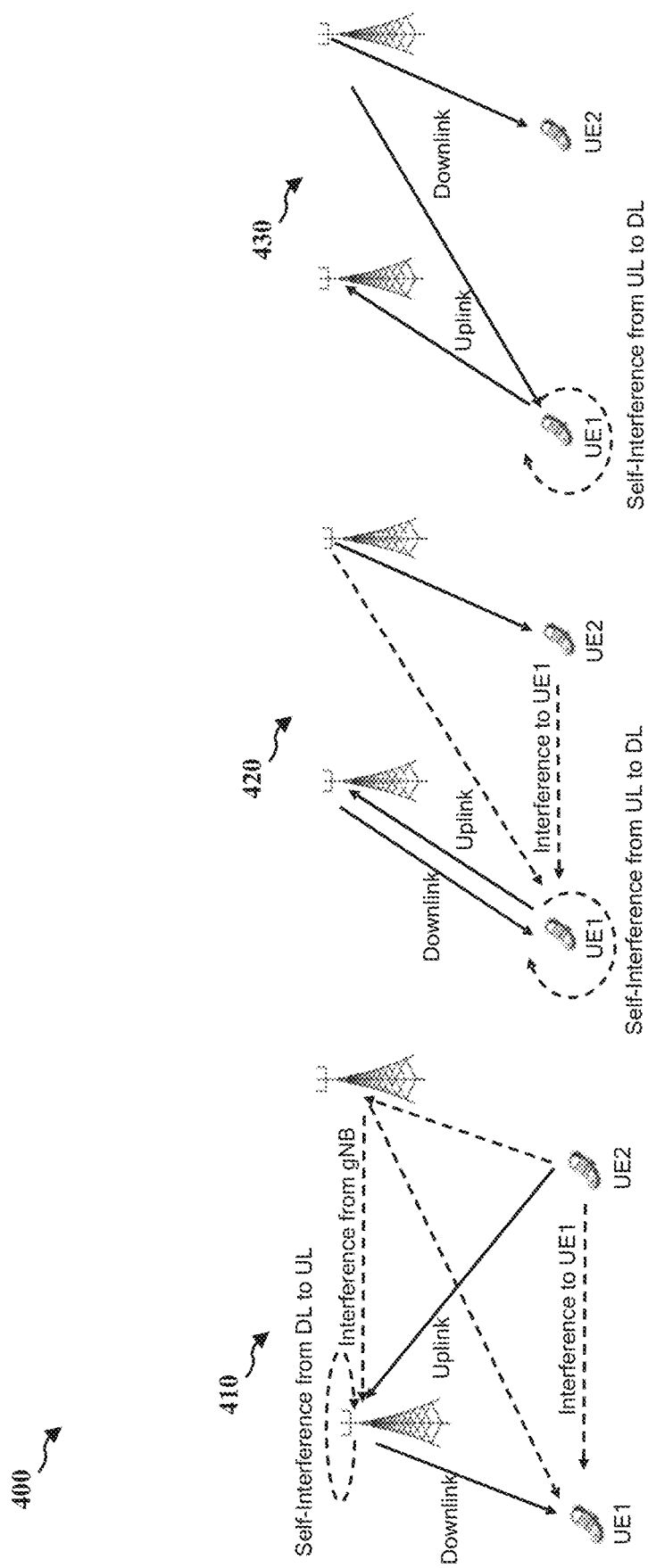
FIG. 4 is a diagram illustrating full duplex communication modes.

FIG. 4 is a diagram 400 illustrating full duplex communication modes. For example, scenario 410 depicts full-duplex base stations with half-duplex UEs 1 and 2. In scenario 410, a full-duplex first gNB may transmit on the downlink channel to UE1 and receive on the uplink channel from UE2. However, UE2 may cause interference on UE1 due to the uplink transmissions to the first gNB. Further, the second gNB may cause interference on the first gNB due to communication with both UE1 and UE2. Additionally, the first gNB may cause self-interference from the downlink and uplink communications.

In an aspect, scenario 420 depicts a full-duplex gNB and a full-duplex UE1. In scenario 420, UE1 experiences self-interference from the full-duplex uplink and downlink communications with the first gNB, from UE2, which receives downlink communications from the second gNB, and from downlink communications from the second gNB.

In an aspect, scenario 430 depicts a full-duplex UE1 using multi-TRP to communicate simultaneously in the uplink with a first gNB and in the downlink with a second gNB. For example, since UE1 is the only entity configured in full-duplex mode, UE1 experiences self-interference due to uplink and downlink communications with both the first gNB and second gNB.

Figure 5:
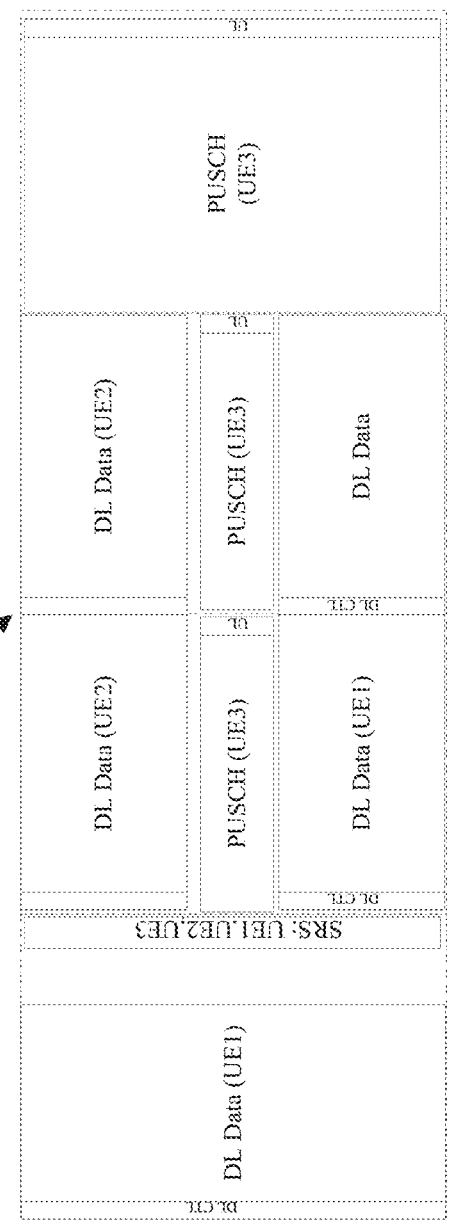
FIG. 5 is a diagram illustrating a half duplex communication mode.
Figure 5:
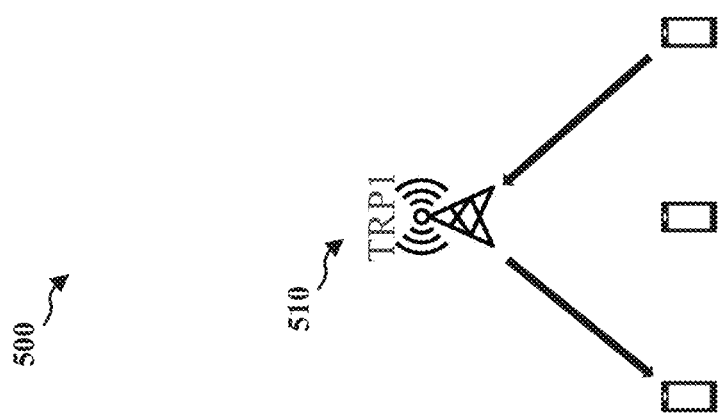

FIG. 5 is a diagram 500 illustrating a half duplex communication mode. For example, scenario 510 depicts a transmission reception point 1 (TRP1) configured in full-duplex mode with half-duplexed UEs. Correspondingly, diagram 520 depicts a subframe/slot breakdown of the full-duplex TRP1 and half-duplex UEs. In this example, the entities may engage in flexible downlink and uplink operation in time across slots and across UEs. That is, simultaneous PDSCH and PUSCH grant for the same subframe/slot for different UEs may be configured. The UEs may change the uplink transmission and/or the downlink reception bandwidth portion between slots in zero latency. The UEs may transmit sounding reference signals (SRS) with full reciprocity (e.g., full-duplex) to cover the whole downlink bandwidth portion and partial reciprocity (e.g., half-duplex) to cover part of the downlink bandwidth. In this example, the dotted lines of diagram 520 depict the subframe/slot breakdown of the full-duplex TRP1 and half-duplex UEs.

Figure 6:
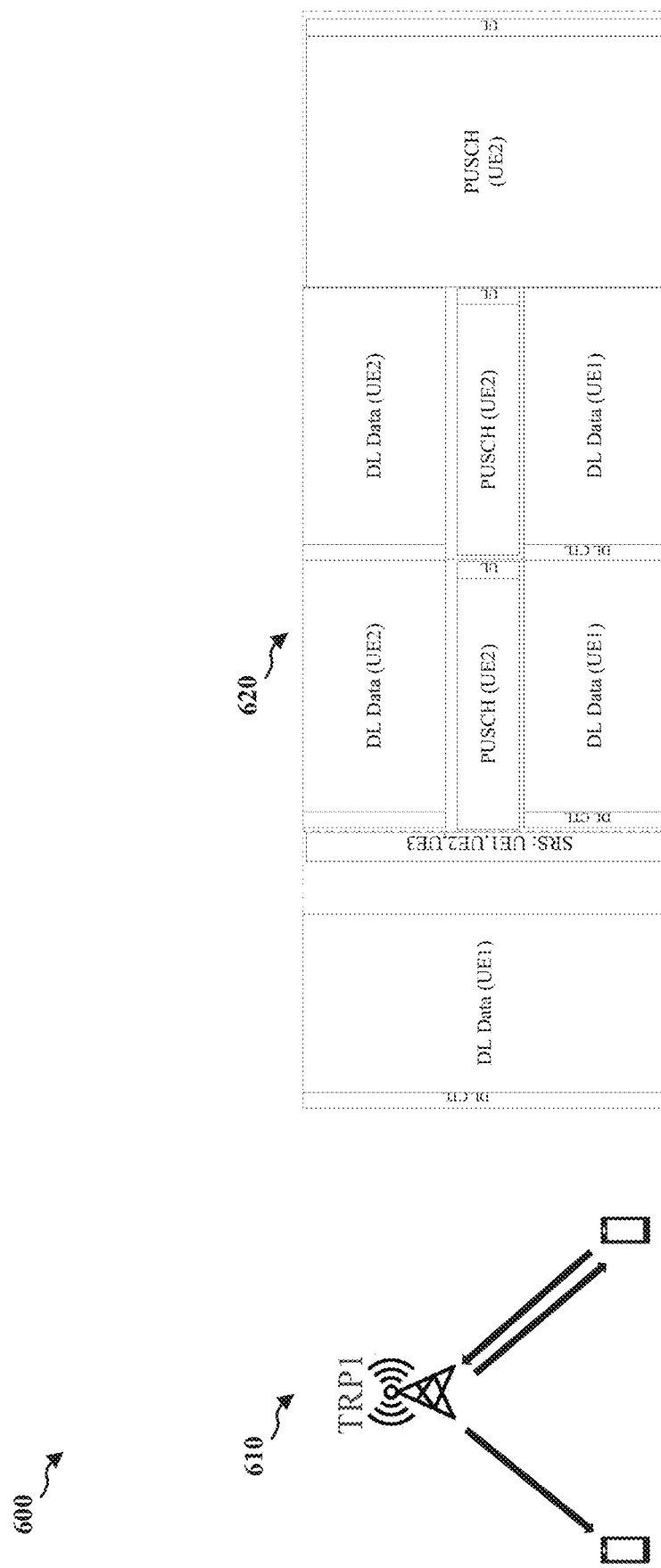
FIG. 6 is a diagram illustrating a full duplex communication mode.

FIG. 6 is a diagram 600 illustrating a full duplex communication mode. For example, scenario 610 depicts a TRP1 is configured in full-duplex mode with a full-duplexed UE and a half-duplexed UE. Correspondingly, diagram 620 depicts a subframe/slot breakdown of the full-duplex TRP1 and full-duplex UEs. In this example, the entities may engage in flexible downlink and uplink operation in time across slots and across UEs. That is, simultaneous PDSCH and PUSCH grant for the same subframe/slot for different UEs may be configured. The full-duplex UEs may be configured for an uplink and downlink grant. The UEs may change the uplink transmission and/or the downlink reception bandwidth portion between slots in zero latency. The UEs may transmit SRS with full reciprocity (e.g., full-duplex) to cover the whole downlink bandwidth portion and partial reciprocity (e.g., half-duplex) to cover part of the downlink bandwidth. In this example, the dotted lines of diagram 620 depict the subframe/slot breakdown of the full-duplex TRP1 and half-duplex UEs.

Figure 7:
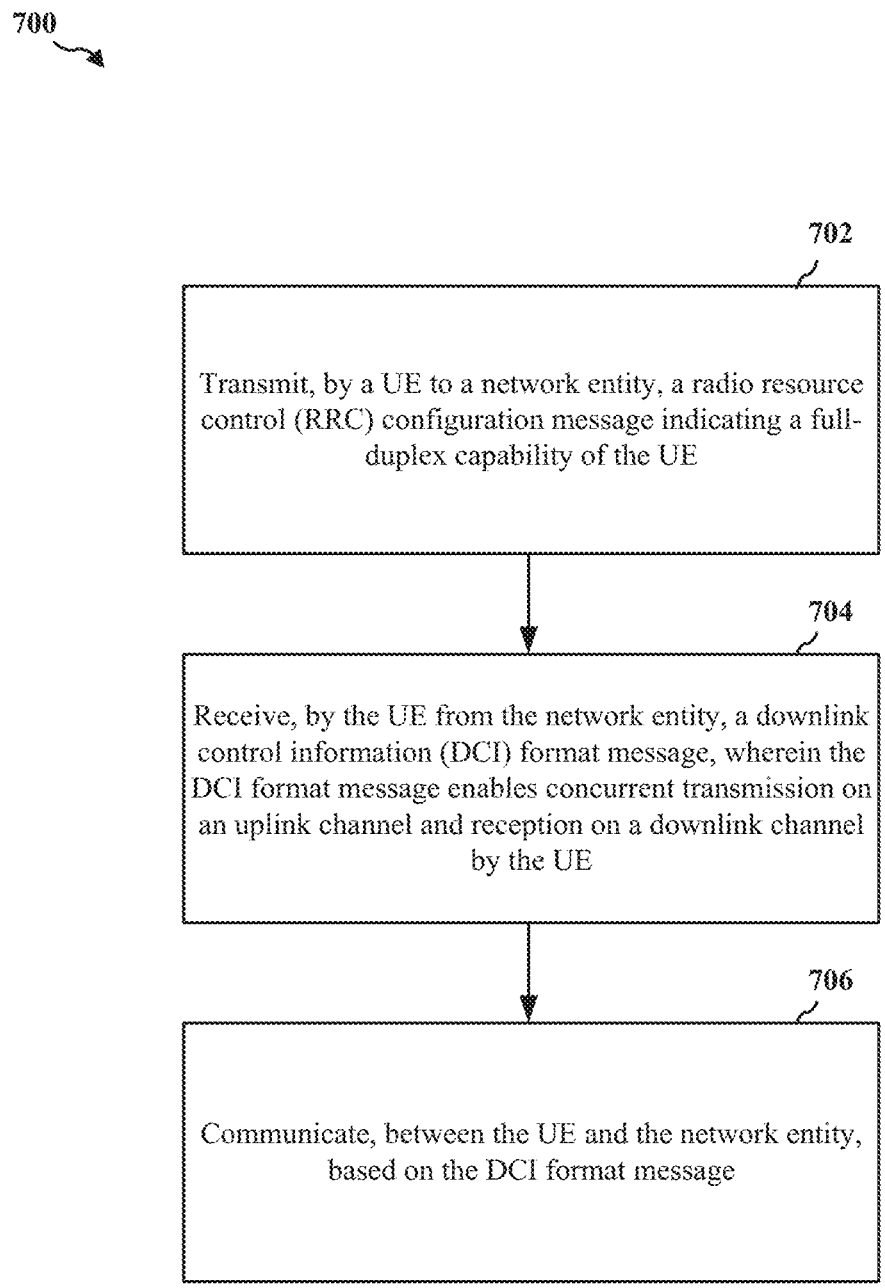
FIG. 7 is a flowchart of a method of wireless communication, and more specifically utilizing a DCI format configured for joint triggering of both an uplink channel and a downlink channel.

FIG. 7 is a flowchart 700 of a method of wireless communication. The method may be performed by a UE (e.g., the UE 104; the apparatus 350; the controller/processor 359, which may include the memory 360, processor(s) 1012, which may include the memory 1016, modem 1040 and which may be the entire UE 104 or a component of the UE 104, such as the TX processor 368, the RX processor 356, and/or the transceiver 1002) in combination with the communication component 198/configuration component 240.

At 702, method 700 includes transmitting, by a UE to a network entity, a RRC configuration message indicating a full-duplex capability of the UE. In an aspect, the UE 104 and/or the communication component 198/configuration component 240 may be configured to transmit, to a network entity, a RRC configuration message indicating a full-duplex capability of the UE. As such, the UE 104 and/or the communication component 198/configuration component 240, e.g., in conjunction with controller/processor 359, which may include the memory 360, processor(s) 1012, which may include the memory 1016, modem 1040, TX processor 368, and transceiver 1002 may define a means for transmitting, by a UE to a network entity, a RRC configuration message indicating a full-duplex capability of the UE.

At 704, method 700 includes receiving, by the UE from the network entity, a DCI format message, wherein the DCI format message enables a format of the concurrent transmission of an uplink channel and reception of a downlink channel by the UE on a same component carrier, wherein the concurrent transmission and reception comprises a transmission and reception in at least one overlapping OFDM symbol. In an aspect, the UE 104 and/or the communication component 198/configuration component 240 may be configured to receive, from the network entity, a DCI format message, wherein the DCI format message enables a format of the concurrent transmission of an uplink channel and reception of a downlink channel by the UE on a same component carrier, wherein the concurrent transmission and reception comprises a transmission and reception in at least one overlapping OFDM symbol. As such, the UE 104 and/or the communication component 198/configuration component 240, e.g., in conjunction with controller/processor 359, which may include the memory 360, processor(s) 1012, which may include the memory 1016, modem 1040, RX processor 356, and transceiver 1002 may define a means for receiving, by the UE from the network entity, a DCI format message, wherein the DCI format message enables a format of the concurrent transmission of an uplink channel and reception of a downlink channel by the UE on a same component carrier, wherein the concurrent transmission and reception comprises a transmission and reception in at least one overlapping OFDM symbol. For example, transmission and reception may correspond to a partial overlap of the OFDM symbol.

In an example of method 700, the DCI format message enables joint triggering of the concurrent transmission on the uplink channel and reception on the downlink channel by the UE. For example, the uplink channel corresponds to a physical uplink shared channel (PUSCH) SRS or a channel for the transmission of SRS. Further, the downlink channel corresponds to a CSI-RS, a physical downlink shared channel (PDSCH), a Positioning Reference Signal (PRS), a Tracking Reference Signal (TRS). Further, the DCI format message is configured to schedule at least one of the downlink channel and the uplink channel that are overlapping in at least one OFDM symbol, the downlink channel comprises a set of OFDM symbols, and the uplink channel comprises a set of OFDM symbols.

In an example of method 700, the DCI format message includes one or more merged fields common to both the transmission on the uplink channel and the reception on the downlink channel. For example, the uplink channel and the downlink channel overlap on a same number of OFDM symbols of a common carrier. The one or more merged fields includes a time domain resource allocation (TDRA) for both the downlink channel and the uplink channel. In an example, the TDRA comprises a time domain resource allocation that starts at an offset of symbols after reception of the DCI format message. Further, the one or more merged fields includes a first frequency domain resource assignment (FDRA) for the downlink channel and a second FDRA for the uplink channel, wherein the first FDRA occupies a greater number of bits than the second FDRA.

In an example of method 700, the one or more merged fields include a joint transmission configuration indication (TCI) indication. For example, each of one or more TCI states have a quasi co-location (QCL) for the downlink channel and a QCL for the uplink channel. Each of one or more TCI states have a QCL for the downlink channel and a SRS resource indicator (SRI) for the uplink channel.

In an example of method 700, the one or more merged fields include a virtual resource block (VRB) to physical resource block (PRB) mapping associated with the downlink channel and the uplink channel.

In an example of method 700, the one or more merged field includes a demodulated reference signal (DMRS) sequence initialization that is associated with a first DMRS of the downlink channel and a second DMRS of the uplink channel.

In an example of method 700, the one or more merged fields include a joint DMRS port indication table that identifies ports for each of the downlink channel and the uplink channel.

In an example of method 700, the one or more merged fields include a joint field that triggers both SRS resources and a CSI RS resources on a same one or more OFDM symbol.

In an example of method 700, receiving, by the UE from the network entity, the DCI format message further comprises receiving, by the UE from the network entity, a first portion of the DCI format message including information indicating a location of a second portion of the DCI format message, wherein the second portion of the DCI format message includes remaining information not included in the first portion of the DCI format message; and receiving, by the UE from the network entity, the second portion of the DCI format message based on the first portion of the DCI format message.

For example, the first portion of the DCI format message includes one or more common fields of the downlink channel and the uplink channel allocations. Further, the one or more common fields include at least one of a time domain resource allocation (TDRA), a frequency domain resource assignment (FDRA), a SRS request, and a CSI request.

For example, the first portion of the DCI format message further includes one or more downlink-related parameters for scheduling the downlink transmission and a pointer to scheduling information of the remaining information in the second portion of the DCI format. Further, method 700 may include determining that the scheduling information is within a scheduled PDSCH; and scheduling a PUSCH after an offset number of symbols based on the determination that the scheduling information is within the scheduled PDSCH.

At 706, method 700 includes communicating, between the UE and the network entity, based on the DCI format message. In an aspect, the UE 104 and/or the communication component 198/configuration component 240 may be configured to transmit, to the one or more second UEs, data using the one or more reserved transmission resources. As such, the UE 104 and/or the communication component 198/configuration component 240, e.g., in conjunction with controller/processor 359, which may include the memory 360, processor(s) 1012, which may include the memory 1016, modem 1040, RX processor 356, and transceiver 1002 may define a means for transmitting, by the first UE to the one or more second UEs, data using the one or more reserved transmission resources.

Figure 8:
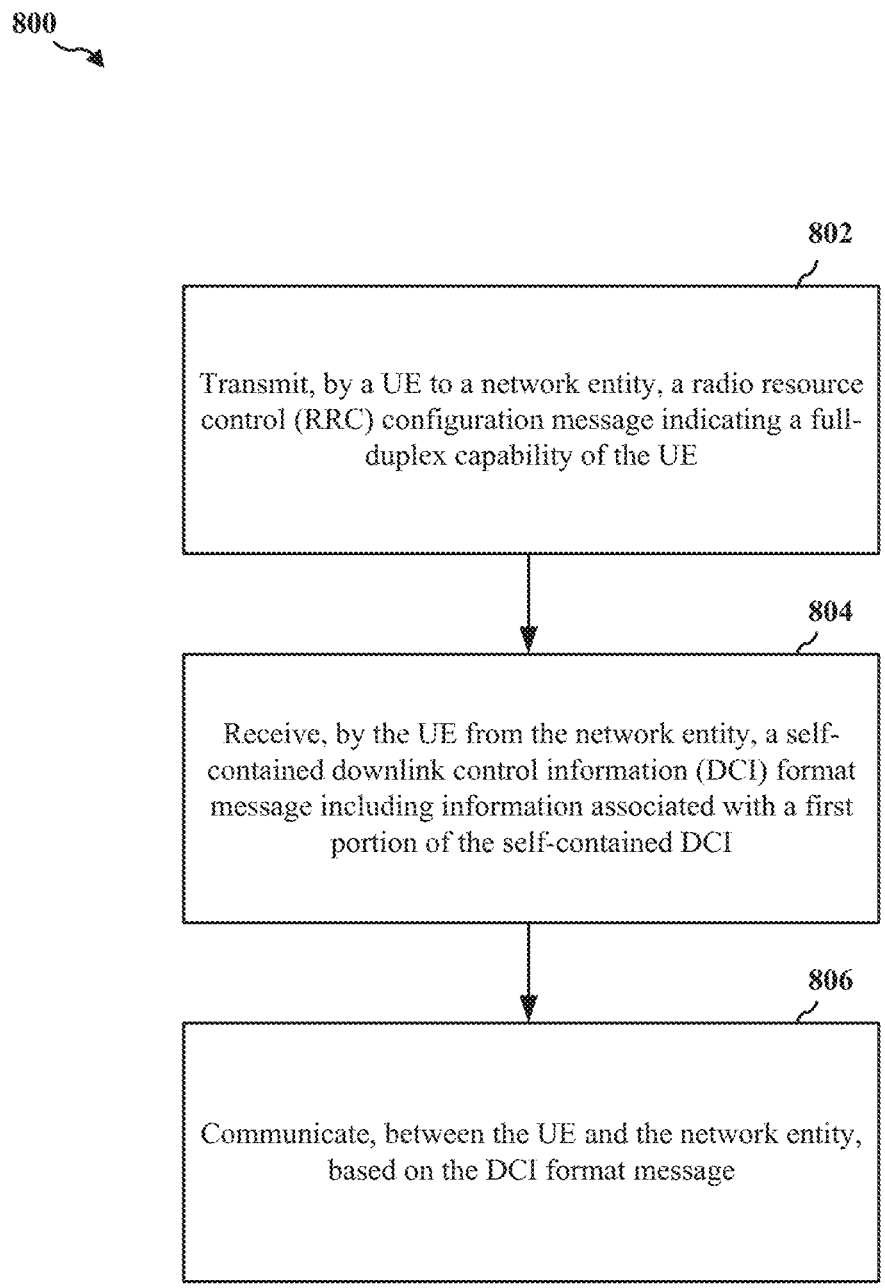
FIG. 8 is a flowchart of a method of wireless communication, and more specifically independent DCIs for overlapped downlink channel and uplink channel allocations.

FIG. 8 is a flowchart 800 of a method of wireless communication. The method may be performed by a UE (e.g., the UE 104; the apparatus 350; the controller/processor 359, which may include the memory 360, processor(s) 1012, which may include the memory 1016, modem 1040 and which may be the entire UE 104 or a component of the UE 104, such as the TX processor 368, the RX processor 356, and/or the transceiver 1002) in combination with the communication component 198/configuration component 240.

At 802, method 800 includes transmitting, by a UE to a network entity, a RRC configuration message indicating a full-duplex capability of the UE. In an aspect, the UE 104 and/or the communication component 198/configuration component 240 may be configured to transmit, by a UE to a network entity, a RRC configuration message indicating a full-duplex capability of the UE. As such, the UE 104 and/or the communication component 198/configuration component 240, e.g., in conjunction with controller/processor 359, which may include the memory 360, processor(s) 1012, which may include the memory 1016, modem 1040, TX processor 368, and transceiver 1002 may define a means for transmitting, by a UE to a network entity, a RRC configuration message indicating a full-duplex capability of the UE.

At 804, method 800 includes receiving, by the UE from the network entity, a self-contained DCI format message including information associated with a first portion of the self-contained DCI. In an aspect, the UE 104 and/or the communication component 198/configuration component 240 may be configured to receive, by the UE from the network entity, a self-contained DCI format message including information associated with a first portion of the self-contained DCI. As such, the UE 104 and/or the communication component 198/configuration component 240, e.g., in conjunction with controller/processor 359, which may include the memory 360, processor(s) 1012, which may include the memory 1016, modem 1040, TX processor 368, and transceiver 1002 may define a means for receiving, by the UE from the network entity, a self-contained DCI format message including information associated with a first portion of the self-contained DCI. In an aspect, the self-contained DCI format message would be capable of triggering downlink PDSCH and PUSCH for a full-duplex UE, such as UE 104. For example, the first portion of the self-contained DCI format message further includes one or more downlink-related parameters for scheduling the downlink transmission and a pointer to scheduling information of remaining information in a second portion of the self-contained DCI.

At 806, method 800 includes communicating, between the UE and the network entity, based on the DCI format message. In an aspect, the UE 104 and/or the communication component 198/configuration component 240 may be configured to communicate, between the UE and the network entity, based on the DCI format message. As such, the UE 104 and/or the communication component 198/configuration component 240, e.g., in conjunction with controller/processor 359, which may include the memory 360, processor(s) 1012, which may include the memory 1016, modem 1040, TX processor 368, and transceiver 1002 may define a means for communicating, between the UE and the network entity, based on the DCI format message.

In an example of method 800, the UE 104 and/or the communication component 198/configuration component 240 may be configured for determining that the scheduling information is within a scheduled PDSCH; and scheduling a PUSCH after an offset number of symbols based on the determination that the scheduling information is within the scheduled PDSCH.

In an example of method 800, the offset number of symbols corresponds to a plurality of symbols subsequent to a last symbol carrying control information for the PUSCH.

In an example of method 800, the first portion of the self-contained DCI format message includes one or more downlink-related parameters and no uplink-related parameters.

Figure 9:
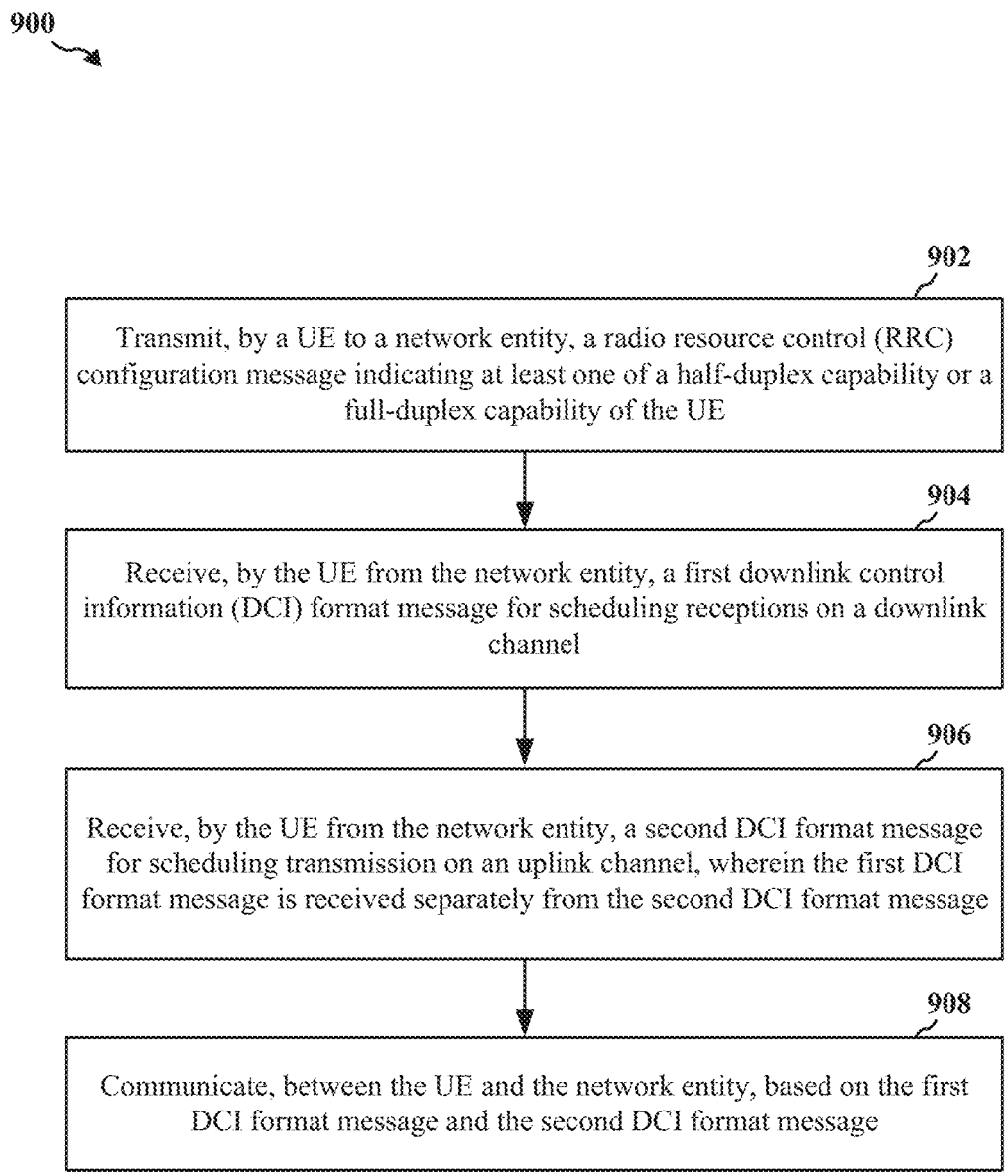
FIG. 9 is a flowchart of a method of wireless communication according to another embodiment.

FIG. 9 is a flowchart 900 of a method of wireless communication. The method may be performed by a UE (e.g., the UE 104; the apparatus 350; the controller/processor 359, which may include the memory 360, processor(s) 1012, which may include the memory 1016, modem 1040 and which may be the entire UE 104 or a component of the UE 104, such as the TX processor 368, the RX processor 356, and/or the transceiver 1002) in combination with the communication component 198/configuration component 240.

At 902, method 900 includes transmitting, by a UE to a network entity, a RRC configuration message indicating at least one of a half-duplex capability or a full-duplex capability of the UE. In an aspect, the UE 104 and/or the communication component 198/configuration component 240 may be configured to transmit to a network entity, a RRC configuration message indicating at least one of a half-duplex capability or a full-duplex capability of the UE. As such, the UE 104 and/or the communication component 198/configuration component 240, e.g., in conjunction with controller/processor 359, which may include the memory 360, processor(s) 1012, which may include the memory 1016, modem 1040, TX processor 368, and transceiver 1002 may define a means for transmitting, by a UE to a network entity, a RRC configuration message indicating at least one of a half-duplex capability or a full-duplex capability of the UE.

At 904, method 900 includes receiving, by the UE from the network entity, a first DCI format message for scheduling receptions on a downlink channel. In an aspect, the UE 104 and/or the communication component 198/configuration component 240 may be configured to receive, from the network entity, a first DCI format message for scheduling receptions on a downlink channel. As such, the UE 104 and/or the communication component 198/configuration component 240, e.g., in conjunction with controller/processor 359, which may include the memory 360, processor(s) 1012, which may include the memory 1016, modem 1040, TX processor 368, and transceiver 1002 may define a means for receiving, by the UE from the network entity, a first DCI format message for scheduling receptions on a downlink channel.

At 906, method 900 includes receiving, by the UE from the network entity, a second DCI format message for scheduling transmission on an uplink channel. In one example, the first DCI format message is received separately from the second DCI format message. In an aspect, the UE 104 and/or the communication component 198/configuration component 240 may be configured to receive, from the network entity, a second DCI format message for scheduling transmission on an uplink channel. In one example, the first DCI format message is received separately from the second DCI format message. As such, the UE 104 and/or the communication component 198/configuration component 240, e.g., in conjunction with controller/processor 359, which may include the memory 360, processor(s) 1012, which may include the memory 1016, modem 1040, TX processor 368, and transceiver 1002 may define a means for receiving, by the UE from the network entity, a second DCI format message for scheduling transmission on an uplink channel. In one example, the first DCI format message is received separately from the second DCI format message.

At 908, method 900 includes communicating, between the UE and the network entity, based on the first DCI format message and the second DCI format message. In an aspect, the UE 104 and/or the communication component 198/configuration component 240 may be configured to communicate, with the network entity, based on the first DCI format message and the second DCI format message. As such, the UE 104 and/or the communication component 198/configuration component 240, e.g., in conjunction with controller/processor 359, which may include the memory 360, processor(s) 1012, which may include the memory 1016, modem 1040, TX processor 368, and transceiver 1002 may define a means for communicating, between the UE and the network entity, based on the first DCI format message and the second DCI format message.

In an example of method 900, the scheduling of reception on the downlink channel and the scheduling of transmission on the uplink channel overlap in at least one OFDM symbol. For example, each of the first DCI format message and the second DCI format message include an indicator for identifying a full-duplex mode or a half-duplex mode.

In an example of method 900, the second DCI format message is configured to be received within a threshold period of time from the reception of the first DCI format message. For example, the first DCI format message and the second DCI format message indicate a full-duplex mode and are associated with a same search space, appear in a same slot, appear on a same PDCCH monitoring span, and appear on a same common carrier.

Figure 10:
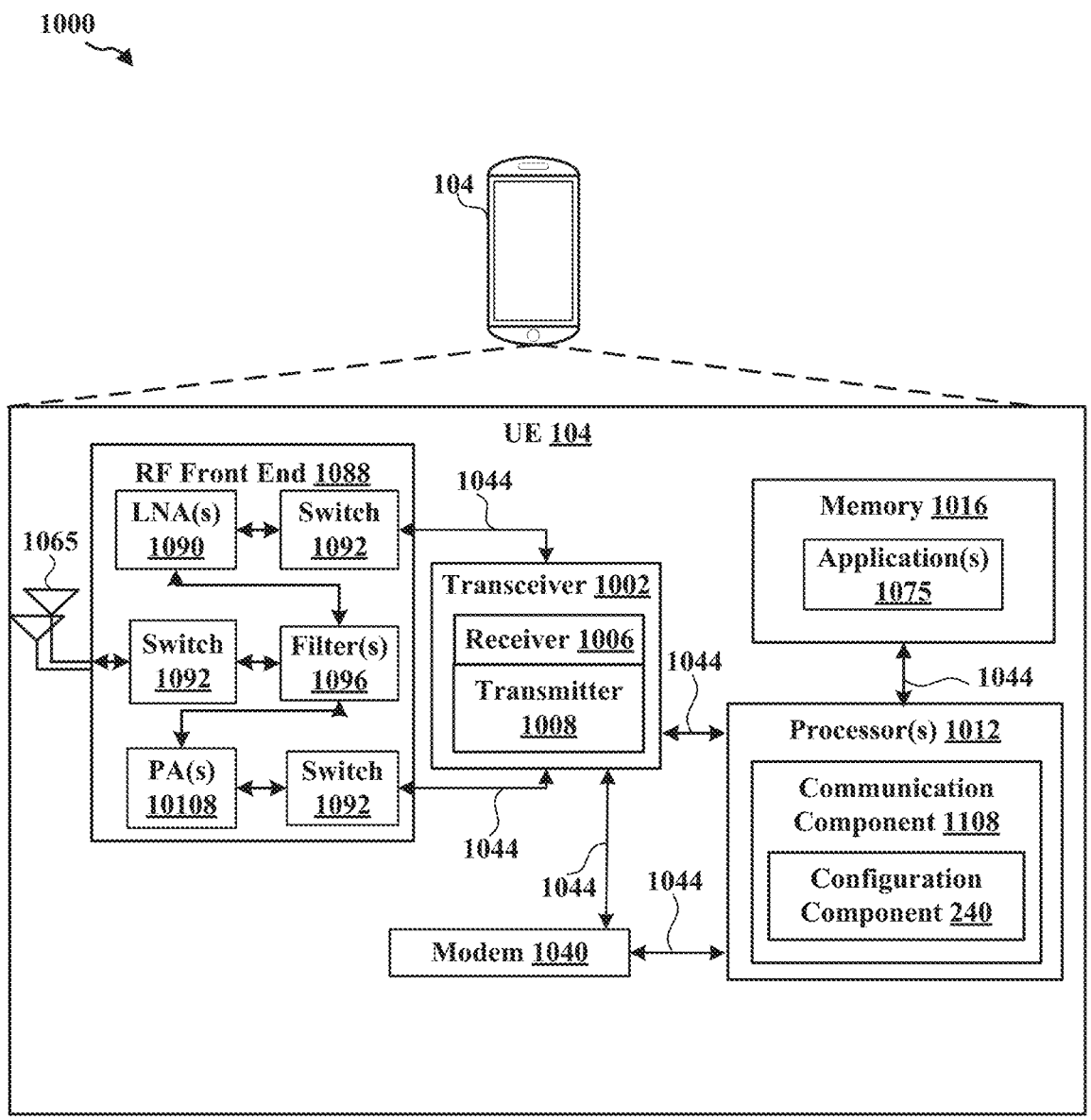
FIG. 10 is a block diagram illustrating an example of a UE, in accordance with various aspects of the present disclosure.

Referring to FIG. 10, one example of an implementation of UE 104 may include a variety of components, some of which have already been described above and are described further herein, including components such as one or more processors 1012 and memory 1016 and transceiver 1002 in communication via one or more buses 1044, which may operate in conjunction with modem 1040 and/or communication component 198 for improved downlink and uplink data DCI triggering for full-duplex UEs.

In an aspect, the one or more processors 1012 can include a modem 1040 and/or can be part of the modem 1040 that uses one or more modem processors. Thus, the various functions related to communication component 198 may be included in modem 1040 and/or processors 1012 and, in an aspect, can be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 1040 associated with communication component 198 may be performed by transceiver 1002.

Also, memory 1016 may be configured to store data used herein and/or local versions of applications 1075 or communicating component 198 and/or one or more of the subcomponents being executed by at least one processor 1012. Memory 1016 can include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes defining communication component 198 and/or one or more of its subcomponents, and/or data associated therewith, when UE 104 is operating at least one processor 1012 to execute communication component 198 and/or one or more of its subcomponents.

Transceiver 1002 may include at least one receiver 1006 and at least one transmitter 1008. Receiver 1006 may include hardware and/or software executable by a processor for receiving data, the code comprising instructions and being stored in a memory (e.g., computer-readable medium). Receiver 1006 may be, for example, a radio frequency (RF) receiver. In an aspect, receiver 1006 may receive signals transmitted by at least one base station 102. Additionally, receiver 1006 may process such received signals, and also may obtain measurements of the signals, such as, but not limited to, Ec/Io, signal-to-noise ratio (SNR), reference signal received power (RSRP), received signal strength indicator (RSSI), etc. Transmitter 1008 may include hardware and/or software executable by a processor for transmitting data, the code comprising instructions and being stored in a memory (e.g., computer-readable medium). A suitable example of transmitter 1008 may including, but is not limited to, an RF transmitter.

Moreover, in an aspect, UE 104 may include RF front end 1088, which may operate in communication with one or more antennas 1065 and transceiver 1002 for receiving and transmitting radio transmissions, for example, wireless communications transmitted by at least one base station 102 or wireless transmissions transmitted by UE 104. RF front end 1088 may be connected to one or more antennas 1065 and can include one or more low-noise amplifiers (LNAs) 1090, one or more switches 1092, one or more power amplifiers (PAs) 1098, and one or more filters 1096 for transmitting and receiving RF signals.

In an aspect, LNA 1090 can amplify a received signal at a desired output level. In an aspect, each LNA 1090 may have a specified minimum and maximum gain values. In an aspect, RF front end 1088 may use one or more switches 1092 to select a particular LNA 1090 and its specified gain value based on a desired gain value for a particular application.

Further, for example, one or more PA(s) 1098 may be used by RF front end 1088 to amplify a signal for an RF output at a desired output power level. In an aspect, each PA 1098 may have specified minimum and maximum gain values. In an aspect, RF front end 1088 may use one or more switches 1092 to select a particular PA 1098 and its specified gain value based on a desired gain value for a particular application.

Also, for example, one or more filters 1096 can be used by RF front end 1088 to filter a received signal to obtain an input RF signal. Similarly, in an aspect, for example, a respective filter 1096 can be used to filter an output from a respective PA 1098 to produce an output signal for transmission. In an aspect, each filter 1096 can be connected to a corresponding LNA 1090 and/or PA 1098. In an aspect, RF front end 1088 can use one or more switches 1092 to select a transmit or receive path using a specified filter 1096, LNA 1090, and/or PA 1098, based on a configuration as specified by transceiver 1002 and/or processor 1012.

As such, transceiver 1002 may be configured to transmit and receive wireless signals through one or more antennas 1065 via RF front end 1088. In an aspect, transceiver may be tuned to operate at specified frequencies such that UE 104 can communicate with, for example, one or more base stations 102 or one or more cells associated with one or more base stations 102. In an aspect, for example, modem 1040 can configure transceiver 1002 to operate at a specified frequency and power level based on the UE configuration of the UE 104 and the communication protocol used by modem 1040.

In an aspect, modem 1040 can be a multiband-multimode modem, which can process digital data and communicate with transceiver 1002 such that the digital data is sent and received using transceiver 1002. In an aspect, modem 1040 can be multiband and be configured to support multiple frequency bands for a specific communications protocol. In an aspect, modem 1040 can be multimode and be configured to support multiple operating networks and communications protocols. In an aspect, modem 1040 can control one or more components of UE 104 (e.g., RF front end 1088, transceiver 1002) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 1012 may correspond to one or more of the processors described in connection with the UE in FIG. 3. Similarly, the memory 1016 may correspond to the memory described in connection with the UE in FIG. 3. Furthermore, transceiver 1002 and/or RF front end 1088 may correspond to and/or be included in transceiver 354 with reference to FIG. 3 and antenna(s) 1065 may correspond to antenna(s) 352 with reference to FIG. 3.

Figure 11:
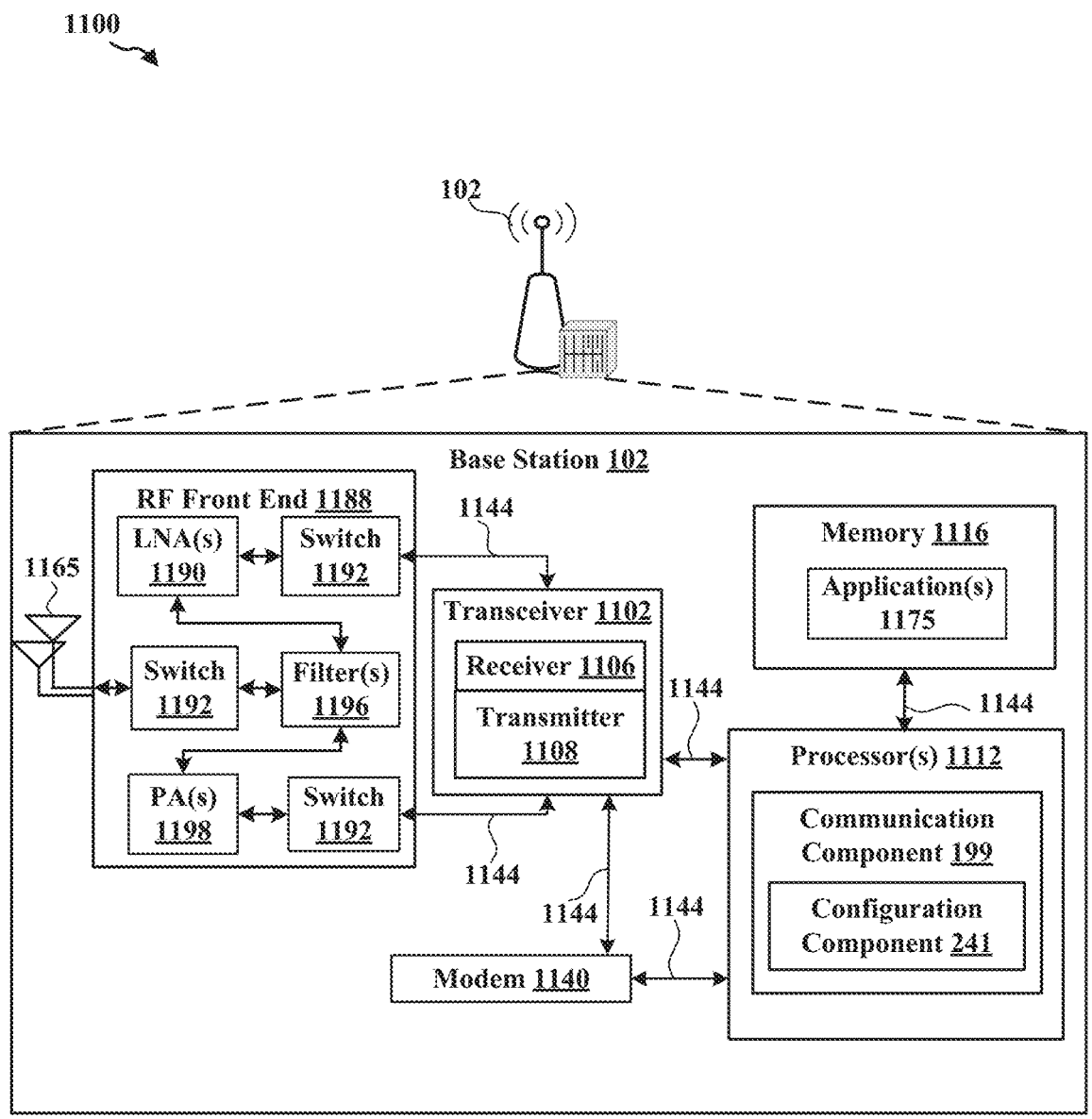
FIG. 11 is a block diagram illustrating an example of a base station, in accordance with various aspects of the present disclosure.

Referring to FIG. 11, one example of an implementation of base station 102 (e.g., a base station 102, as described above) may include a variety of components, some of which have already been described above, but including components such as one or more processors 1112 and memory 1116 and transceiver 1102 in communication via one or more buses 1144, which may operate in conjunction with modem 1140 and communication component 199 for communicating reference signals.

The transceiver 1102, receiver 1106, transmitter 1108, one or more processors 1112, memory 1116, applications 1175, buses 1144, RF front end 1188, LNAs 1190, switches 1192, filters 1196, PAs 1198, and one or more antennas 1165 may be the same as or similar to the corresponding components of UE 104, as described above, but configured or otherwise programmed for base station operations as opposed to UE operations.

In an aspect, the processor(s) 1112 may correspond to one or more of the processors described in connection with the base station in FIG. 3. Similarly, the memory 1116 may correspond to the memory described in connection with the base station in FIG. 3. Furthermore, transceiver 1102 and/or RF front end 1188 may correspond to and/or be included in transceiver 318 with reference to FIG. 3 and antenna(s) 1165 may correspond to antenna(s) 320 with reference to FIG. 3.

Some Further Example Clauses

Implementation examples are described in the following numbered clauses:

1. A method of wireless communication, comprising:
   transmitting, by a UE to a network entity, a radio resource control (RRC) configuration message indicating a full-duplex capability of the UE;
   receiving, by the UE from the network entity, a downlink control information (DCI) message, wherein the DCI message enables concurrent transmission of an uplink channel and reception of a downlink channel by the UE on a same component carrier,
   wherein the DCI message includes one or more fields common to both the transmission on the uplink channel and the reception on the downlink channel on the same component carrier, and
   wherein the concurrent transmission and reception comprises a transmission and reception in at least one overlapping orthogonal frequency division multiplexing (OFDM) symbol; and
   communicating, between the UE and the network entity, based on the DCI message.
2. The method of any preceding clause, wherein the DCI message enables joint triggering of the concurrent transmission on the uplink channel and reception on the downlink channel by the UE.
3. The method of any preceding clause, wherein the uplink channel corresponds to a physical uplink shared channel (PUSCH), Sounding Reference Signal (SRS).
4. The method of any preceding clause, wherein the downlink channel corresponds to a Channel State Information Reference Signal (CSI-RS), a physical downlink shared channel (PDSCH), a Positioning Reference Signal (PRS), a Tracking Reference Signal (TRS).
5. The method of any preceding clause, wherein the DCI message is configured to schedule at least one of the downlink channel and the uplink channel that are overlapping in at least one orthogonal frequency division multiplexing (OFDM) symbol, the downlink channel comprises a set of OFDM symbols, and the uplink channel comprises a set of OFDM symbols.
6. The method of any preceding clause, wherein the uplink channel and the downlink channel overlap on a same number of OFDM symbols of a common carrier.
7. The method of any preceding clause, wherein the one or more common fields includes a time domain resource allocation (TDRA) for both the downlink channel and the uplink channel.
8. The method of any preceding clause, wherein the TDRA comprises a time domain resource allocation that starts at an offset of symbols after reception of the DCI message.
9. The method of any preceding clause, wherein the one or more common fields includes a first frequency domain resource assignment (FDRA) for the downlink channel and a second FDRA for the uplink channel, wherein the first FDRA occupies a greater number of bits than the second FDRA.
10. The method of any preceding clause, wherein the one or more common fields includes a joint transmission configuration indication (TCI) indication.
11. The method of any preceding clause, wherein each of one or more TCI states have a quasi co-location (QCL) for the downlink channel and a QCL for the uplink channel.
12. The method of any preceding clause, wherein each of one or more TCI states have a quasi co-location (QCL) for the downlink channel and a sounding reference signal (SRS) resource indicator (SRI) for the uplink channel.
13. The method of any preceding clause, wherein the one or more common fields includes a virtual resource block (VRB) to physical resource block (PRB) mapping associated with the downlink channel and the uplink channel.
14. The method of any preceding clause, wherein the one or more common fields includes a demodulated reference signal (DMRS) sequence initialization that is associated with a first DMRS of the downlink channel and a second DMRS of the uplink channel.
15. The method of any preceding clause, wherein the one or more common fields includes a joint demodulated reference signal (DMRS) port indication table that identifies ports for each of the downlink channel and the uplink channel.
16. The method of any preceding clause, wherein the one or more common fields includes a joint field that triggers both sounding reference signal (SRS) resources and a channel station information (CSI) reference signal (RS) resources on a same one or more OFDM symbol.
17. The method of any preceding clause, wherein receiving, by the UE from the network entity, the DCI message further comprises:
    receiving, by the UE from the network entity, a first portion of the DCI message including information indicating a location of a second portion of the DCI message, wherein the second portion of the DCI message includes remaining information not included in the first DCI message; and
    receiving, by the UE from the network entity, the second portion of the DCI message based on the first portion of the DCI message.
18. The method of any preceding clause, wherein the first portion of the DCI message includes one or more common fields of the downlink channel and the uplink channel allocations.
19. The method of any preceding clause, wherein the one or more common fields includes at least one of a time domain resource allocation (TDRA), a frequency domain resource assignment (FDRA), a sounding reference signal (SRS) request, and a channel station information (CSI) request.
20. A method of wireless communication, comprising:
    transmitting, by a UE to a network entity, a radio resource control (RRC) configuration message indicating a full-duplex capability of the UE;
    receiving, by the UE from the network entity, a self-contained downlink control information (DCI) message including information associated with a first portion of the self-contained DCI message; and
    communicating, between the UE and the network entity, based on the self-contained DCI message.
21. The method of any preceding clause, wherein the first portion of the self-contained DCI message further includes one or more downlink-related parameters for scheduling the downlink transmission and a pointer to scheduling information of remaining information in a second portion of the self-contained DCI message.
22. The method of any preceding clause, further comprising:
    determining that the scheduling information is within a scheduled physical downlink shared channel (PDSCH); and scheduling a physical uplink shared channel (PUSCH) after an offset number of symbols based on the determination that the scheduling information is within the scheduled PDSCH.

23. The method of any preceding clause, wherein the offset number of symbols corresponds to a plurality of symbols subsequent to a last symbol carrying control information for the PUSCH.

24. The method of any preceding clause, wherein the first portion of the self-contained DCI message includes one or more downlink-related parameters and no uplink-related parameters.

25. A user equipment (UE) for wireless communication, comprising:
a transceiver;
a memory configured to store instructions; and
one or more processors communicatively coupled with the transceiver and the memory, wherein the one or more processors are configured to cause the UE to:
transmit, via the transceiver to a network entity, a radio resource control (RRC) configuration message indicating a full-duplex capability of the UE;
receive, via the transceiver from the network entity, a downlink control information (DCI) message, wherein the DCI message enables concurrent transmission of an uplink channel and reception of a downlink channel by the UE on a same component carrier,
wherein the DCI message includes one or more fields common to both the transmission on the uplink channel and the reception on the downlink channel on the same component carrier, and
wherein the concurrent transmission and reception comprises a transmission and reception in at least one overlapping orthogonal frequency division multiplexing (OFDM) symbol; and
communicate, between the UE and the network entity, based on the DCI message.

26. The UE of any preceding clause, wherein the DCI message enables joint triggering of the concurrent transmission on the uplink channel and reception on the downlink channel by the UE.

27. The UE of any preceding clause, wherein the uplink channel corresponds to a physical uplink shared channel (PUSCH), Sounding Reference Signal (SRS).

28. The UE of any preceding clause, wherein the downlink channel corresponds to a Channel State Information Reference Signal (CSI-RS), a physical downlink shared channel (PDSCH), a Positioning Reference Signal (PRS), a Tracking Reference Signal (TRS).

29. The UE of any preceding clause, wherein the DCI message is configured to schedule at least one of the downlink channel and the uplink channel that are overlapping in at least one orthogonal frequency division multiplexing (OFDM) symbol, the downlink channel comprises a set of OFDM symbols, and the uplink channel comprises a set of OFDM symbols.

30. The UE of any preceding clause, wherein the uplink channel and the downlink channel overlap on a same number of OFDM symbols of a common carrier.

31. The UE of any preceding clause, wherein the one or more common fields includes a time domain resource allocation (TDRA) for both the downlink channel and the uplink channel.

32. The UE of any preceding clause, wherein the TDRA comprises a time domain resource allocation that starts at an offset of symbols after reception of the DCI message.

33. The UE of any preceding clause, wherein the one or more common fields includes a first frequency domain resource assignment (FDRA) for the downlink channel and a second FDRA for the uplink channel, wherein the first FDRA occupies a greater number of bits than the second FDRA.

34. The UE of any preceding clause, wherein the one or more common fields includes a joint transmission configuration indication (TCI) indication.

35. The UE of any preceding clause, wherein each of one or more TCI states have a quasi co-location (QCL) for the downlink channel and a QCL for the uplink channel.

36. The UE of any preceding clause, wherein each of one or more TCI states have a quasi co-location (QCL) for the downlink channel and a sounding reference signal (SRS) resource indicator (SRI) for the uplink channel.

37. The UE of any preceding clause, wherein the one or more common fields includes a virtual resource block (VRB) to physical resource block (PRB) mapping associated with the downlink channel and the uplink channel.

38. The UE of any preceding clause, wherein the one or more fields includes a demodulated reference signal (DMRS) sequence initialization that is associated with a first DMRS of the downlink channel and a second DMRS of the uplink channel.

39. The UE of any preceding clause, wherein the one or more common fields includes a joint demodulated reference signal (DMRS) port indication table that identifies ports for each of the downlink channel and the uplink channel.

40. The UE of any preceding clause, wherein the one or more common fields includes a joint field that triggers both sounding reference signal (SRS) resources and a channel station information (CSI) reference signal (RS) resources on a same one or more OFDM symbol.

41. The UE of any preceding clause, wherein receiving, from the network entity, the DCI message further comprises:
receiving, via the transceiver from the network entity, a first portion of the DCI message including information indicating a location of a second portion of the DCI message, wherein the second portion of the DCI message includes remaining information not included in the first DCI message; and
receiving, via the transceiver from the network entity, the second portion of the DCI message based on the first portion of the DCI message.

42. The UE of any preceding clause, wherein the first portion of the DCI message includes one or more common fields of the downlink channel and the uplink channel allocations.

43. The UE of any preceding clause, wherein the one or more common fields includes at least one of a time domain resource allocation (TDRA), a frequency domain resource assignment (FDRA), a sounding reference signal (SRS) request, and a channel station information (CSI) request.

44. A user equipment (UE) of wireless communication, comprising:
a transceiver;
a memory configured to store instructions; and
one or more processors communicatively coupled with the transceiver and the memory, wherein the one or more processors are configured to cause the UE to:
  transmit, via the transceiver to a network entity, a radio resource control (RRC) configuration message indicating a full-duplex capability of the UE;
  receive, via the transceiver from the network entity, a self-contained downlink control information (DCI) message including information associated with a first portion of the self-contained DCI message; and
  communicate, with the network entity, based on the self-contained DCI message.

45. The UE of any preceding clause, wherein the first portion of the self-contained DCI message further includes one or more downlink-related parameters for scheduling the downlink transmission and a pointer to scheduling information of remaining information in a second portion of the self-contained DCI message.

46. The UE of any preceding clause, wherein the one or more processors are further configured to cause the UE to:
determine that the scheduling information is within a scheduled physical downlink shared channel (PDSCH); and
schedule a physical uplink shared channel (PUSCH) after an offset number of symbols based on the determination that the scheduling information is within the scheduled PDSCH.

47. The UE of any preceding clause, wherein the offset number of symbols corresponds to a plurality of symbols subsequent to a last symbol carrying control information for the PUSCH.

48. The UE of any preceding clause, wherein the first portion of the self-contained DCI message includes one or more downlink-related parameters and no uplink-related parameters.

49. A user equipment (UE) for wireless communication, comprising:
means for transmitting, to a network entity, a radio resource control (RRC) configuration message indicating a full-duplex capability of the UE;
means for receiving, from the network entity, a downlink control information (DCI) message, wherein the DCI message enables concurrent transmission of an uplink channel and reception of a downlink channel by the UE on a same component carrier,
wherein the DCI message includes one or more fields common to both the transmission on the uplink channel and the reception on the downlink channel on the same component carrier, and
wherein the concurrent transmission and reception comprises a transmission and reception in at least one overlapping orthogonal frequency division multiplexing (OFDM) symbol; and
means for communicating, between the UE and the network entity, based on the DCI message.

50. A user equipment (UE) for wireless communication, comprising:
means for transmitting, to a network entity, a radio resource control (RRC) configuration message indicating a full-duplex capability of the UE;
means for receiving, from the network entity, a self-contained downlink control information (DCI) message including information associated with a first portion of the self-contained DCI; and
means for communicating, between the UE and the network entity, based on the DCI message.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:
1. A method of wireless communication, comprising:
transmitting, by a UE to a network entity, a radio resource control (RRC) configuration message indicating a full-duplex capability of the UE;
receiving, by the UE from the network entity, a downlink control information (DCI) message, wherein the DCI message enables concurrent transmission of an uplink channel and reception of a downlink channel by the UE on a same component carrier,
wherein the DCI message includes one or more fields common to both the transmission on the uplink channel and the reception on the downlink channel on the same component carrier,
wherein the concurrent transmission of the uplink channel and reception of the downlink channel comprises a respective transmission and reception in at least one overlapping orthogonal frequency division multiplexing (OFDM) symbol; and communicating, between the UE and the network entity, based on the DCI message.

2. The method of claim 1, wherein the DCI message enables joint triggering of the concurrent transmission on the uplink channel and reception on the downlink channel by the UE.

3. The method of claim 2, wherein the uplink channel corresponds to at least one of a physical uplink shared channel (PUSCH), or a channel for the transmission of Sounding Reference Signal (SRS), and wherein the downlink channel corresponds to at least one of a channel for the transmission of a Channel State Information Reference Signal (CSI-RS), a physical downlink shared channel (PDSCH), a channel for the transmission of a Positioning Reference Signal (PRS), or a channel for the transmission of a Tracking Reference Signal (TRS).

4. The method of claim 2, wherein the DCI message is configured to schedule at least one of the downlink channel and the uplink channel that are overlapping in at least one orthogonal frequency division multiplexing (OFDM) symbol, wherein the downlink channel and the uplink channel each comprises a set of OFDM symbols.

5. The method of claim 1, wherein the uplink channel and the downlink channel overlap on a same number of OFDM symbols of a common carrier.

6. The method of claim 1, wherein the one or more common fields include a time domain resource allocation (TDRA) for both the downlink channel and the uplink channel.

7. The method of claim 6, wherein the TDRA starts at an offset of symbols after reception of the DCI message.

8. The method of claim 1, wherein the one or more common fields include a first frequency domain resource assignment (FDRA) for the downlink channel and a second FDRA for the uplink channel, wherein the first FDRA occupies a greater number of bits than the second FDRA.

9. The method of claim 1, wherein the one or more common fields include a joint transmission configuration indication (TCI) indication.

10. The method of claim 9, wherein each of one or more TCI states has a first quasi co-location (QCL) for the downlink channel, and a second QCL for the uplink channel or a sounding reference signal (SRS) resource indicator (SRI) for the uplink channel.

11. The method of claim 1, wherein the one or more common fields include at least one of:
a virtual resource block (VRB) to physical resource block (PRB) mapping associated with the downlink channel and the uplink channel;
a demodulated reference signal (DMRS) sequence initialization that is associated with a first DMRS of the downlink channel and a second DMRS of the uplink channel;
a joint demodulated reference signal (DMRS) port indication table that identifies ports for each of the downlink channel and the uplink channel; or
a joint field that triggers both sounding reference signal (SRS) resources and a channel station information (CSI) reference signal (RS) resources on a same one or more OFDM symbol.

12. The method of claim 1, wherein receiving, by the UE from the network entity, the DCI message further comprises:
receiving, by the UE from the network entity, a first portion of the DCI message including information indicating a location of a second portion of the DCI message, wherein the second portion of the DCI message includes remaining information not included in the first DCI message; and
receiving, by the UE from the network entity, the second portion of the DCI message based on the first portion of the DCI message.

13. The method of claim 12, wherein the first portion of the DCI message includes one or more common fields of a downlink channel allocation and an uplink channel allocation.

14. The method of claim 13, wherein the one or more common fields include at least one of a time domain resource allocation (TDRA), a frequency domain resource assignment (FDRA), a sounding reference signal (SRS) request, and a channel station information (CSI) request.

15. A user equipment (UE) for wireless communication, comprising:
a transceiver;
a memory configured to store instructions; and
one or more processors coupled with the transceiver and the memory, wherein the one or more processors are configured to cause the UE to:
transmit, via the transceiver to a network entity, a radio resource control (RRC) configuration message indicating a full-duplex capability of the UE;
receive, via the transceiver from the network entity, a downlink control information (DCI) message, wherein the DCI message enables concurrent transmission of an uplink channel and reception of a downlink channel by the UE on a same component carrier,
wherein the DCI message includes one or more fields common to both the transmission on the uplink channel and the reception on the downlink channel on the same component carrier,
wherein the concurrent transmission of the uplink channel and reception of the downlink channel comprises a respective transmission and reception in at least one overlapping orthogonal frequency division multiplexing (OFDM) symbol; and
communicate, between the UE and the network entity, based on the DCI message.

16. The UE of claim 15, wherein the DCI message enables joint triggering of the concurrent transmission on the uplink channel and reception on the downlink channel by the UE.

17. The UE of claim 16, wherein the uplink channel corresponds to at least one of a physical uplink shared channel (PUSCH), or a channel for the transmission of Sounding Reference Signal (SRS), and wherein the downlink channel corresponds to at least one of a channel for the transmission of a Channel State Information Reference Signal (CSI-RS), a physical downlink shared channel (PDSCH), a channel for the transmission of a Positioning Reference Signal (PRS), or a channel for the transmission of a Tracking Reference Signal (TRS).

18. The UE of claim 16, wherein the DCI message is configured to schedule at least one of the downlink channel and the uplink channel that are overlapping in at least one orthogonal frequency division multiplexing (OFDM) symbol, wherein the downlink channel and the uplink channel each comprises a set of OFDM symbols.

19. The UE of claim 15, wherein the uplink channel and the downlink channel overlap on a same number of OFDM symbols of a common carrier.

20. The UE of claim 15, wherein the one or more common fields include a time domain resource allocation (TDRA) for both the downlink channel and the uplink channel.

21. The UE of claim 20, wherein the TDRA starts at an offset of symbols after reception of the DCI message.

22. The UE of claim 15, wherein the one or more common fields include a first frequency domain resource assignment (FDRA) for the downlink channel and a second FDRA for the uplink channel, wherein the first FDRA occupies a greater number of bits than the second FDRA.

23. The UE of claim 15, wherein the one or more common fields include a joint transmission configuration indication (TCI) indication.

24. The UE of claim 23, wherein each of one or more TCI states has a quasi co-location (QCL) for the downlink channel, and a QCL for the uplink channel or a sounding reference signal (SRS) resource indicator (SRI) for the uplink channel.

25. The UE of claim 15, wherein the one or more common fields include at least one of:
 a virtual resource block (VRB) to physical resource block (PRB) mapping associated with the downlink channel and the uplink channel;
 a demodulated reference signal (DMRS) sequence initialization that is associated with a first DMRS of the downlink channel and a second DMRS of the uplink channel;
 a joint demodulated reference signal (DMRS) port indication table that identifies ports for each of the downlink channel and the uplink channel; or
 a joint field that triggers both sounding reference signal (SRS) resources and a channel station information (CSI) reference signal (RS) resources on a same one or more OFDM symbol.

26. The UE of claim 15, wherein receiving, via the transceiver from the network entity, the DCI message further comprises:
 receiving, via the transceiver from the network entity, a first portion of the DCI message including information indicating a location of a second portion of the DCI message, wherein the second portion of the DCI message includes remaining information not included in the first DCI message; and
 receiving, via the transceiver from the network entity, the second portion of the DCI message based on the first portion of the DCI message.

27. The UE of claim 26, wherein the first portion of the DCI message includes one or more common fields of a downlink channel allocation and an uplink channel allocation, wherein the one or more common fields include at least one of a time domain resource allocation (TDRA), a frequency domain resource assignment (FDRA), a sounding reference signal (SRS) request, and a channel station information (CSI) request.

* * * * *